United States Patent
Liebenow

(10) Patent No.: US 7,363,519 B2
(45) Date of Patent: Apr. 22, 2008

(54) METHOD AND APPARATUS FOR POWER MANAGEMENT BY USER NEEDS

(75) Inventor: Frank Liebenow, Jefferson, SD (US)

(73) Assignee: Gateway Inc., Irvine, CA (US)

(*) Notice: Subject to any disclaimer, the term of this patent is extended or adjusted under 35 U.S.C. 154(b) by 336 days.

(21) Appl. No.: 11/022,979

(22) Filed: Dec. 24, 2004

(65) Prior Publication Data

US 2006/0143483 A1    Jun. 29, 2006

(51) Int. Cl.
*G06F 1/00* (2006.01)
*G06F 1/26* (2006.01)
*G06F 1/32* (2006.01)
*G06F 11/30* (2006.01)

(52) U.S. Cl. .................. 713/300; 713/320; 713/340
(58) Field of Classification Search .............. 713/300, 713/310, 320, 321, 322, 323, 324, 330, 340
See application file for complete search history.

(56) References Cited

U.S. PATENT DOCUMENTS

| | | | | |
|---|---|---|---|---|
| 5,532,935 A | * | 7/1996 | Ninomiya et al. | 700/296 |
| 6,065,125 A | * | 5/2000 | Shiell et al. | 713/330 |
| 6,710,578 B1 | * | 3/2004 | Sklovsky | 320/127 |
| 7,124,397 B1 | * | 10/2006 | Mathur et al. | 717/101 |
| 7,139,920 B2 | * | 11/2006 | Williams | 713/300 |

* cited by examiner

*Primary Examiner*—James K. Trujillo
*Assistant Examiner*—Michael J Brown
(74) *Attorney, Agent, or Firm*—Scott Charles Richardson; The Brevetto Law Group, PLLC

(57) ABSTRACT

A portable computer system with a battery and a processor, a memory, a display and storage device; all powered by the battery which includes a power management circuit configured to control the operation of the processor and memory in order to vary an amount of power consumed. The power management circuit is configured to accept a requested operating time and is configured to signal the power management circuit to modify the operation of the processor, memory, storage device and display so that the portable computer system can operate from the battery for said requested operating time.

23 Claims, 3 Drawing Sheets

METHOD AND APPARATUS FOR POWER MANAGEMENT BY USER NEEDS

FIELD OF THE INVENTION

The present invention generally relates to the field of power management of portable devices utilizing a power source that depletes with use, and more specifically relates to a method and apparatus for controlling the consumption of power while providing a generally deterministic period of time that the portable device may be expected to operate.

BRIEF DESCRIPTION OF THE RELATED ART

There are several known forms of power management. In general, power management refers to a system that may track usage of a portable device and adjust operating levels of various components within the portable device so as to maximize the device's performance and or the device's operating time. Power management is used in a variety of portable devices and may also be employed in non-portable devices. Often these devices use a power source that depletes with usage such as, for example, a battery or a high capacity capacitor. In general, power management will allow the user to control (or will automatically control) the operating characteristics of various subsystems of the device in order to optimize operating life of the power source (before requiring recharging or replacement thereof) or to optimize performance. For example, it is well known that in a portable system that operates from a power source that depletes with use (hereinafter referred to as a battery for simplifying the description), there may be an apparatus that monitors usage of the portable system and when it appears that demands on the system for performance are low, the apparatus may reduce the clock speed of various components, and in particular, the processor. It is known in the industry that power consumption relates to the square of the clock frequency times the logic voltage, so reducing the clock speed to ½ of its maximum may roughly reduce power consumption by four.

There are also other ways to reduce power consumption such as shutting off power to certain power consuming subsystems that may not be needed. For example, several I/O components may be disabled when a system is being used in a portable mode (such as when the system is operating on battery power), and motors in hard disk drives, floppy disk drives, or optical drives may be turned off, as well as other energy consuming measures. Another way to reduce power consumption is to reduce the brightness of the display system, or to slow the speed of graphics.

There are many portable devices that may operate on battery power and utilize power management to extend battery life. These devices include, but are not limited to, notebook computers, tablet computers, portable digital assistants (PDAs), cell phones, cordless phones, wireless radio transceivers, portable radios, portable TVs, portable CD players, portable DVD players, portable test equipment, portable handheld data collection devices, etc. Many of these include some form of power management to increase battery life. Unfortunately, increases in battery life may reduce the robustness or performance of the portable device. For example, in a notebook computer operating on battery power, if the CPU speed is reduced, there is a resulting performance degradation. Similarly, if the display brightness is reduced, it may be more difficult for a user to see information depicted on the display. Also, if the hard drive motor is stopped, it may take a few seconds to resume the rotation of the disc when the user requests data. There also may be multiple modes of operation, such as when the system is operating from a steady power source, such as power distributed to homes through a power grid. Under these circumstances, a power management mode may be initiated that optimizes performance over power consumption since battery power is not being used and therefore does not need to be conserved. Conversely, when the same system operates on battery-supplied power, a different power management mode may be initiated that optimizes the duration of the charge of the battery, but reduces the performance of various subsystems. It should be noted that performance in the context of this description may refer to various user-detectable or non-user-detectable operating aspects of a portable system, such as range of operation (wireless), display brightness, response time for various operations, heat generation, noise from cooling fans, etc.

In general, when power management systems work to increase battery life, they reduce performance or usability in some way and may change noise and heat generation. In general, there are tradeoffs such that if more battery operating time is needed, then less performance is provided, or if more performance is required, less battery life is delivered.

In some power management systems, power management tradeoffs are fixed and the user is not allowed to specify any changes or parameters. In these systems, different usage scenarios may be detected and the operating modes of the various subsystems may be adjusted accordingly. For example, in a cordless phone or cellular phone, when a user is quiet, perhaps listening utilizing the wireless receiver, the wireless transmitter may be placed in a low-power mode. Conversely, when the user is talking, the wireless receiver may be placed in a low-power mode and the wireless transmitter restored to full power. Additionally, the output power of the wireless transmitter may be adjusted depending upon the detected input signal, which may indicate distance from the base station. All of these adjustments are performed without the knowledge of the user and are not adjustable by the user.

In some power management systems, the user is allowed to adjust various parameters to make tradeoffs between battery life and performance. The user may request optimal performance at the risk of lesser battery life if the user needs to use the portable device in a certain mode. An example of this might be using a portable device that has a display in an outdoor, daylight situation. In this mode of operation, if the power management system reduces the brightness of the display in order to increase battery life, the display may be too dim or washed-out to be perceptible by the user. Therefore, an adjustment may be provided for the user to increase the display brightness, even though the user knows that battery life may be reduced. In these adjustable power management systems, the adjustment can be made in various ways. In the display brightness example, there may be a control on the system that allows the user to change brightness, perhaps a dial control, a slider, an up/down pair of buttons, a combination of keys on a keyboard (e.g., Function up-arrow and Function down-arrow) or a user interface within an application. There also may be system parameters that determine how and when these adjustments are made. In that case, a configuration or setup utility might allow the user to lock brightness to a certain level or to prevent it from being changed to save power. For a hard disk, the utility may allow the user to specify a period of inactivity that would trigger a power management mode that would shut off the hard disk's motor.

In some systems, a setting may be provided in the setup or configuration utility that allows the user to select maximum power savings or maximum performance. Furthermore, the user may be allowed to select from a range of setting between the worst-case battery life (that which would result if no power management is enabled) and the best-case battery life (that which would result if maximum power management is enabled). This would allow the user to tune their system of maximum battery life or maximum performance or somewhere between the two. In this, the user would be able to select a desired amount of tradeoff between battery life and performance, but would not have any indication of how long the battery may last.

Although there are many ways for a user to control power management as described above, none provides the user with an expected amount of usage. The user must determine how much time they will need to operate in a portable mode, and then guess at which parameters should be set to which values in order to accomplish the task of setting the system to provide a certain amount of usable time. Furthermore, most users have difficulty understanding the meanings of display timeouts, hard disk timeouts, CPU clock speeds, and the like, and usually do not modify any power management settings. If there was an easy, intuitive way of controlling power management, in terms that most users would understand, the users would be more apt to take advantage of that mechanism and may find the portable usage of such a product more useful.

SUMMARY OF THE INVENTION

A solution to the problem of controlling power management in a way that may be more sensible to a user would provide a control that allows the user to specify how long he or she plans to use the system in a portable mode (e.g., operating on battery power). In the language of the user, the user can request a specific amount of operating time, say 3 hours, and the power management system could take this requirement and adjust various power management parameters such as hard disk timeouts, display brightness, CPU speed, and the like, to values that may support achieving 3 hours of use on battery power. Furthermore, the power management system may also monitor the rate of power usage while the system is in use and, if it determines that the energy in the battery is draining faster or slower than expected (which might result in a relatively shorter or longer usage period), then the power management system may use that feedback to fine tune the power management settings to achieve the requested time.

The present invention is directed to a power management system that allows the user to set the time that is required. In response to this, the power management system may automatically adjust various power management settings to attempt to achieve the requested amount of time. The required time may be set in a utility through various user interface mechanisms, such as a slide control ranging from a small amount of time to many hours. Optionally, the required time may be set by filling in a period of time in a field. As a further option, there may be a default required time set as a system parameter that is used each time the system runs on battery power when no explicit required time is set. This implementation of the invention permits the user to instruct the system as to the time needed, rather than setting individual power management parameters, thereby providing a setting that a user might more easily understand. This system would allow the user to determine how much time they will need to use their system.

It is to be understood that both the forgoing general description and the following detailed description are exemplary only and are not restrictive of the invention as claimed. The general functions of this invention may be combined in different ways to provide the same functionality while still remaining within the scope of this invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently discussed embodiment of the invention, an example of which is illustrated in the accompanying drawings.

Figure 1:
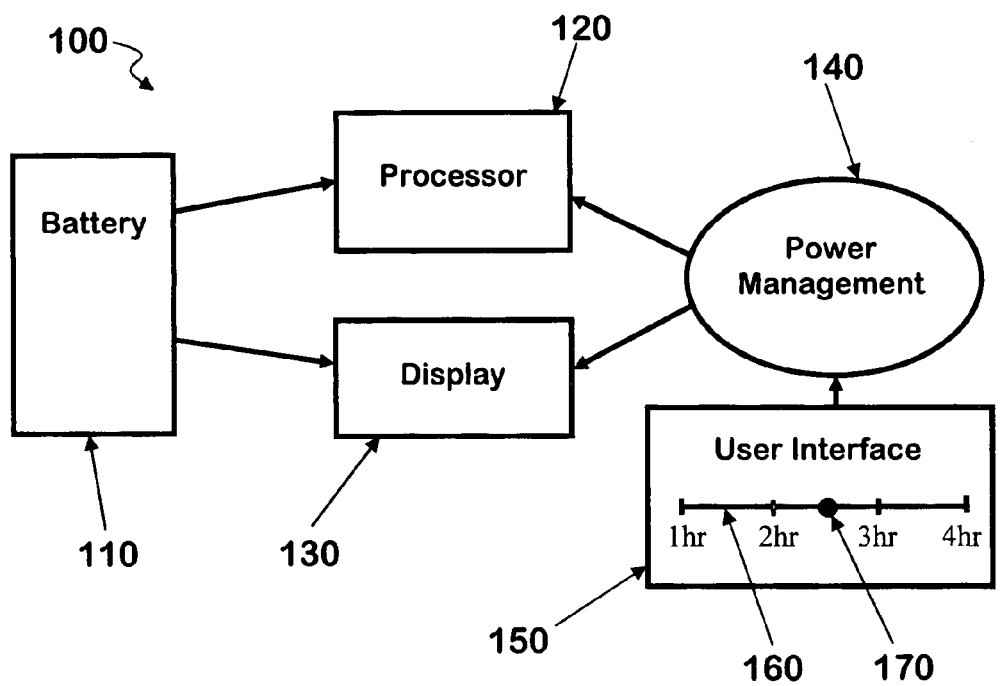
FIG. 1 shows a block diagram of a portable system configured with a power management system in accordance with the present invention.

Referring now to FIG. 1, a block diagram 100 of a portable system configured with a power management system is depicted in accordance with the present invention. In the described system, a battery 110 provides power to a processor 120 and a display 130 when the system operates in a portable mode. Some systems always operate in a portable mode, whereas the battery 110 may be replaceable, possibly with a battery that may be recharged external to the portable system. In some systems, the battery 110 may be charged within the system. Furthermore, in some systems, there may be a mode of operation whereby the portable system operates from an external power source, possibly 120 VAC and may also charge the battery 110 either while operating in this mode or when in a non-operating state. This invention relates to an operating mode whereby some or all of the power required by the portable system is derived from the battery 110. The battery 110 can be any portable power source known in the industry and is not necessarily limited to conventional batteries. In addition to known battery technologies such as lead-acid, NiCd, NiMH, Li, Alkaline, Zinc, Zink-air, etc.; other power sources may be used such as capacitors, super-capacitors, fuel cells and the like. For the purposes of this application, the term "battery" will refer to any power source that depletes with use and can be made portable.

In FIG. 1, a power management system 140 presents a user-interface 150 with a selectable amount of time that the user wishes to use the portable system in a portable mode. A time bar 160 allows the user to select any amount of time in a time period, such as, for example, between approximately 1 hour and approximately 4 hours. This type of user-interface input function is well known in the industry and can be implemented as a slider 170 that can be moved to any place within the time bar 160, perhaps by clicking on a selection point or by dragging the slider 170 to the desired position. In FIG. 1, the slider 170 is positioned to provide approximately 2.5 hours of operation from the battery 110. Note that the scale of 1 hour to 4 hours may vary based on the range of possible operations from battery. This scale may be fixed in some embodiments or may be calculated based on historical or predicted battery life. For example, if a known battery has been known to provide 1.5 hours of operation with no power management and 7 hours of operation with full power management, and this battery is roughly 50% depleted, and then the time bar may be displayed with a minimum time of 0.75 hours and a maximum time of 3.5 hours (roughly half of the minimum and maximum).

Figure 1A:
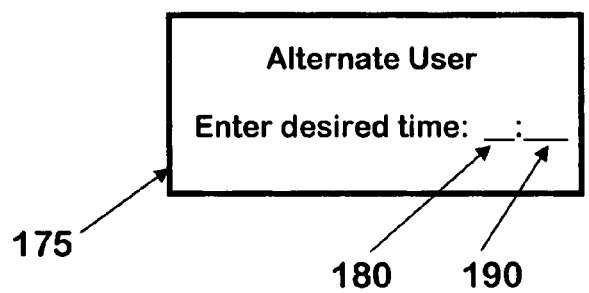

Many other user-interface techniques may be used to permit the user to input the desired amount of operating time, including selecting from discrete steps (such as radio buttons selecting 1 hr, 2 hr, 3 hr, etc.), entering a numeric value in a field, actuating an indicator with up/down selectors to increase/decrease the desired time, etc. For example, in FIG. 1a, an optional user interface 175 is shown in which a user might enter the requested amount of time in hours 180 and minutes 190.

In this embodiment, the power management system 140 accepts the time input selected by the slider 170 or the time inputs 180 and 190 and adjusts the power management of the processor 120 and the display 130 to attempt to achieve the desired operating time. In this example, if the user selected 1 hour, then the power management system 140 may minimize power management of the processor 120 and the display 130, thereby providing the best possible performance. If the user selected 4 hours, then the power management system 140 may maximize power management of the processor 120 and the display 130, thereby providing the longest possible operation in a portable mode. Many methods of power management are known in the industry, including reducing display brightness, reducing logic clock speeds, reducing logic operating voltage, shutting down unused logic or subsystems, slowing or disabling motors or fans, changing timeouts, etc. The power management system 140 may then monitor the status of the battery 110 during the usage cycle and if it is determined that the battery may not deliver the requested usage time, then additional power management settings may be adjusted to reduce or increase power consumption to provide either a longer usage cycle (at least what was requested by the user) or better performance during the usage cycle.

Figure 2:
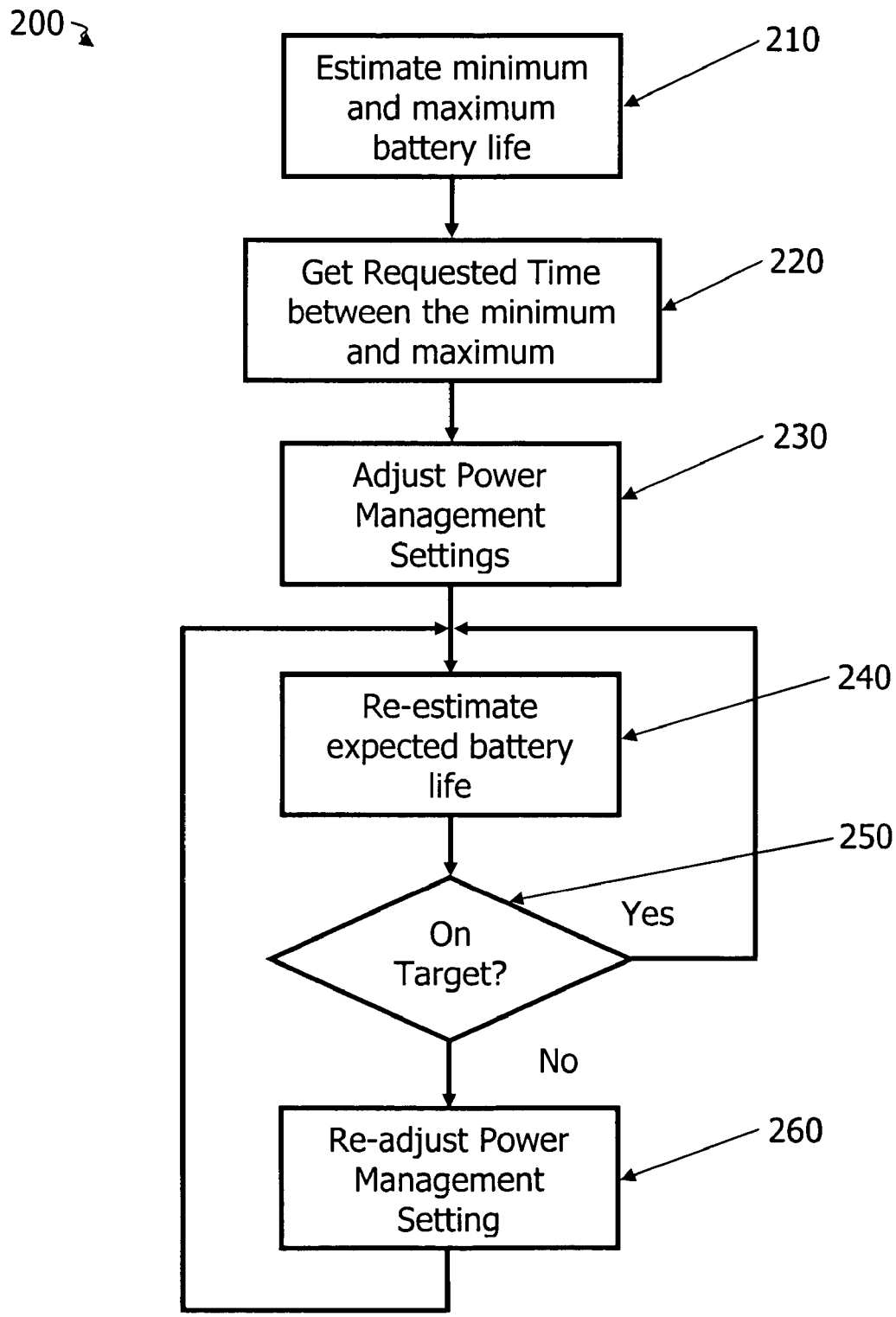
FIG. 2 shows a flow chart of the operation of a power management system in accordance with the present invention.

Referring now to FIG. 2, an operational flow chart 200 of the power management system will be described. The power management system starts by estimating a minimum and maximum battery life (step 210). At this point, the power management system estimates how much time the portable system can operate from the battery given the current estimated charge of the battery, both a minimum amount of time (if no power management is used) and a maximum amount of time (if full power management is used). For example, in a system with a battery and motorized pump that operates at two speeds, the motor can be power managed to operate at a lower speed and possibly use less power. Therefore, in this example, if the battery could provide enough power for 2 hours of operation at the fast speed (no power management) and 4 hours of operation at the slow speed (full power management), then the estimated minimum would be 2 hours and maximum 4 hours.

Once the range of operating times have been estimated, the power management system would present a user interface that requests a user to specify how long the user desires to use the portable device. The user enters this time (step 220) and its value would be somewhere between the minimum and maximum values, inclusive. This time may be entered using any of the various user interfaces known in the industry, including, but not limited to, dedicated input devices such as a slider or using displays coupled with input devices such as up/down buttons, mouse clicks, typing the time in hours/minutes, graphical user interfaces such as sliders, radio buttons and selections. The power management system may adjust power management settings (step 230) to attempt to provide the desired amount of portable usage time. In the simple example above, this adjustment might comprise setting the motor speed to fast or slow. In a more complex system, this adjustment might comprise adjusting the clock speed of various components such as CPUs and graphics processors. Further, this adjustment might comprise adjusting timeouts such as how long before a disk drive stops rotating after its last access or how long before a display is shut off after the last keystroke was recognized. Also, this adjustment might comprise adjusting the power supply voltage to various logic components or changing a motor or fan speed. Still further, the adjustment might comprise changing the output power of a transmitter or shutting off power to unused subsystems or adjusting the brightness of a display or other lighted object. This list is not exhaustive of the adjustments and actions that may be taken by the power management system, and is therefore just a sample of what can be adjusted to modify power consumption and is meant to be an example. Various portable devices have motors, amplifiers, magnetics, etc., each of which may be adjusted to consume more or less power and hence can have their power consumption managed by the power management system.

Once the power management settings are made (step 230), the system may continuously sample the battery subsystem and generate a new estimate of the expected battery life (step 240), possibly in a similar method as the initial estimation (at step 210). If the new estimation of the expected battery life is on target (step 250), then changes to power management are not required and the power management system may repeat the re-estimation. If the new estimation of the expected battery life is not on target, then the power management system may adjust the power management settings (step 260) to attempt to achieve the user-requested amount of operating time at the best possible system performance. For example, if the new estimate of expected battery life indicates that there is a relatively high level of battery power left unconsumed to a degree that more battery life remains than would be needed to achieve the desired operating time, then some power management adjustments may be relaxed to use the available battery power at a higher or faster rate, possibly providing better performance. On the other hand, if the new estimation of the expected battery life indicates that the battery life is not sufficient to provide power for the entire remaining portion of the desired operating time at the current power consumption rate under the current power management settings, additional power management actions may be invoked, or adjustment of the existing power management actions may be performed, to reduce power consumption and attempt to deliver the desired operating time. Of course, these power management actions may result in reduced performance of the device. This re-estimation and adjustment process can be repeated continuously in the background or can be scheduled to be performed at various intervals such as, for example, every 5 minutes.

Figure 3:
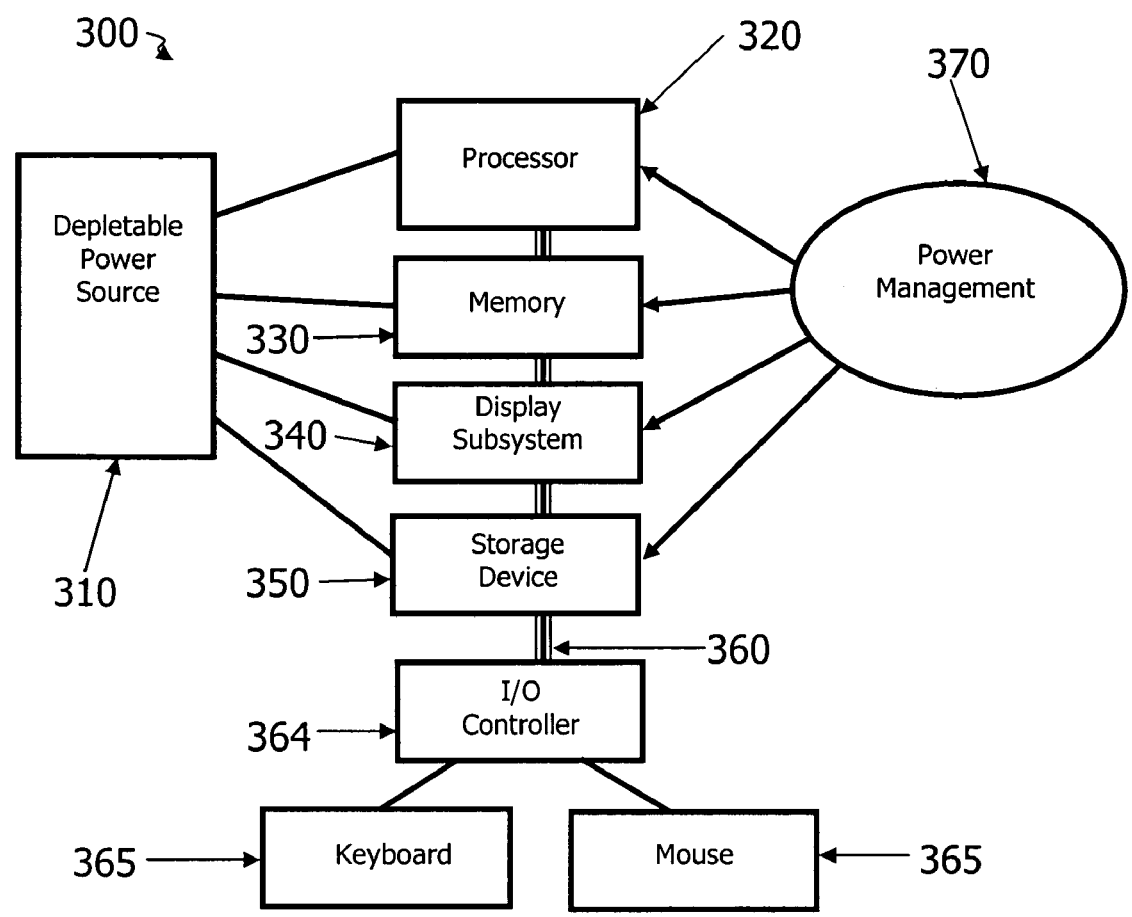
FIG. 3 shows a block diagram of a typical portable system.

Referring now to FIG. 3, a block diagram of a suitable portable system configured with a power management system in accordance with the present invention is depicted. In the described system, a depletable power source 310 provides power to a processor 320, a memory 330, a display subsystem 340, a storage device 350, an I/O controller 364, a keyboard 365 and a mouse 366 when the system operates in a portable mode, e.g., when the system is not receiving power from a power source connected to the power grid.

Some systems may always operate in a portable mode, whereas the depletable power source 310 may be replaceable, possibly with other depletable power sources that may be recharged external to the portable system. In some systems, the depletable power source 310 may be charged within the system. Furthermore, in some systems, there may be a mode of operation whereby the portable system operates from an external power source, possibly 120 VAC, and may also charge the depletable power source 310 either while the system is in an operating mode or in a non-operating mode. This invention relates to an operating mode whereby some or all of the power required by the portable system is derived from the depletable power source 310. The depletable power source 310 can be any portable power source known in the industry and is not limited to conventional batteries. In addition to known battery technologies such as lead-acid, NiCd, NiMH, Lithium-Ion, Alkaline, Zinc, Zink-air, etc.; other power sources may be used such as capacitors, super-capacitors, fuel cells and the like.

In FIG. 3, the processor 320, the memory 330, the display subsystem 340, the storage device 350 and the I/O controller 364 are connected by one or more serial or parallel busses 360. These busses 360 allow exchange of data and instructions as well as commands and power. The I/O controller 364 is operably connected to the keyboard 365 and the mouse 366 by means known in the industry, for example, a serial interface such as RS-232, PS/2 or USB. Although not shown in FIG. 3, other devices may be attached to busses 360, such as memory card slots, PCMCIA or Cardbus slots, input/output ports such as serial ports, parallel ports, USB ports and Firewire ports, and wireless devices. These devices are not shown for simplicity purposes and all such devices may be part of a portable system and may be power managed using similar methods as described.

Continuing with FIG. 3, the power management module 370 is in control of several operational aspects of the processor 320, the memory 330, the display subsystem 340 and the storage device 350. The power management module 370 can control the operating speed or clock speed of the devices within the portable computer 300. It can also control the operating voltages of these devices, the timeouts associated with these devices and other parameters depending upon the device. For example, it can also control the output power of a wireless transmitter or the brightness of a display. The elements of FIG. 3 are known in the industry and utilized in many existing portable computers. Unfortunately, the prior methods of controlling power management only allow a user to set many of these parameters individually or set the system as a whole to a performance mode or to a longer battery life mode. None of these allows the user to specify how long they wish to utilize the portable computer. In an embodiment of the present invention, the user may specify how much time they desire to use the portable computer, perhaps using the keyboard 365 and/or the mouse 366 to enter a desired operating time. Consequently, the power management module 370 may take the desired operating time and translate that into individual power management settings that should provide the desired usage time. Through this method, the user can indicate how much time they desire and the system may be set to provide approximately that amount of operating time while providing possibly the optimal performance given the time requirement. Of course, with any heuristic system that makes tradeoffs, the system may make tradeoffs that contradict with how the user plans to use the system. For example, if three hours are requested and the power management subsystem reduces the display brightness in order to achieve approximately 3 hours of operation on battery power, the brightness may be too low and make the system less usable. In rare cases such as these, the user may be provided with the option to make individual power management settings or to further tune the settings that are automatically set by the power management subsystem. Additionally, if the user overrides an automatic power management setting, the system may make additional power management settings to compensate for that override in an attempt to deliver the desired operating time. For example, if the user specifies two hours of operation and the system sets various power management settings to deliver two hours, then the user forces the brightness from the system setting to full brightness, the system may readjust other components, perhaps CPU speed, to reduce power consumption on those components to a level where the requested two hours may be attained. Optionally, if the user forces a setting for which the system cannot compensate, the system may warn the user that their setting will prevent achieving the specified operating time.

Illustratively, a user may be flying from New York to San Francisco and may need about four hours to check email and prepare a proposal. Therefore, the user can set the power management system to operate at a level that provides approximately four hours of usage instead of the user having to, for example, set the brightness to 80%, set the CPU speed to ½ speed, and set the hard disk timeout to three minutes, in hopes that these actions will prolong the life of the batteries current charge to four hours. The system could then make all of the appropriate settings to achieve 4 hours of battery life given the current battery power charge. Additionally, in another embodiment, the system can monitor progress toward achieving the requested 4 hours and if conditions exist whereby given the current power management settings, more than 4 hours may be achieved, then the system can back off or reduce some of the power management settings to provide possibly better performance for the requested 4 hours. An example of a condition that may cause this scenario is when the user works from AC power for a period of time, perhaps while waiting to board an aircraft.

Another advantage of the present invention is the ability to determine a range of possible usage times and present those usage times to the user through a user interface so that a user may select from times within that range. For example, if the battery could normally provide around one hour of usage if all subsystems operate in full-power mode and three hours of usage if all subsystems operate in lowest power mode, then the user may select anywhere between one hour and three hours. Although the user could select less than 1 hour, they would still more than likely still get the same performance with a full hour of use. In the same example, if the battery charge has been partially drawn down, and has only approximately one-half of its rated charge capacity remaining, then the user might be able to select between one-half hour, and one and one-half hours.

Another advantage of the present invention is the ability to monitor the battery condition over time, and provide ongoing adjustments of the power management settings based upon actual, as opposed to predicted or expected, power consumption. For example, if the battery is discharging faster (or slower) than previously expected, which would probably result in less (or more) useful time than requested, the power management system can further refine it settings to try and provide the requested time. Through a feedback mechanism, possibly based on heuristic calculations, the power management system may attempt to estimate how long the battery will last under the current settings and may adjust the settings to use less power if it is expected to fall short of the requested time and possibly it may adjust settings to use more power and hence provide better performance if it is expected to surpass the requested time.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An electronic device comprising:
    a power source;
    a first electronic component configured to operate using power provided by said power source;
    a power management device configured to control a power consumption setting of said first electronic component; and
    an input device configured to accept a time specification, connected to said power management device, said time specification being indicative of a desired period of operation by said electronic device using power supplied by said power source, wherein, in response to the entry of the time specification from a user, said power management device adjusts the power consumption setting for said first electronic component to provide a period of operation by said electronic device until said power source is depleted, said period of operation being substantially the same as said time specification; and
    input means configured to accept a user override input overriding the power consumption setting by the power management device for said first electronic component, wherein the power management device is configured to adjust a power consumption setting of a second electronic component in an attempt to compensate for the user override input.

2. The electronic device as claimed in claim 1, wherein said power source comprises a depletable power source that has a finite amount of power to supply to said electronic device prior to any recharging of said power source.

3. The electronic device as claimed in claim 1, wherein said power management device is configured to provide the user with a range of time periods for operation.

4. The electronic device as claimed in claim 3, wherein a minimum of said range is a minimum period of operation without adjustment to the power consumption setting, and a maximum of said range is a maximum period of operation with adjustment to the power consumption setting.

5. The electronic device as claimed in claim 1, wherein said power management device is configured to perform, during an actual period of operation, a comparison of an estimated rate of power consumption to achieve the desired period of operation and an actual rate of power consumption to determine the accuracy of the estimated rate of power consumption.

6. The electronic device as claimed in claim 1, wherein said power consumption setting is selected from a group consisting of a device timeout, a clock speed, a logic power supply voltage, a motor speed, a fan speed, a display brightness setting and an indicator brightness setting.

7. The electronic device as claimed in claim 1, wherein said time specification is entered on a keyboard in terms of hours and minutes.

8. The electronic device as claimed in claim 1, wherein said time specification is entered by adjusting the position of an indicator within a range of values.

9. The electronic device as claimed in claim 1, further comprising:
    a display device configured to display a warning that said user override input will cause said electronic device to operate for less than the time specification.

10. A method of controlling power management settings comprising:
    obtaining a requested amount of operating time for a device powerable by a depletable power source;
    determining a set of power consumption settings for achieving said requested amount of operating time for said device using power from said depletable power source until said power source is depleted; and
    setting power consumption settings for a set of hardware components of said device to said determined set of power management settings;
    receiving a user override command to set a power consumption setting for one hardware component among the set of hardware components;
    wherein said set of power consumption settings are determined in response to receiving the entry of the requested amount of operating time from a user; and
    adjusting the power consumption settings of at least a second hardware component among the set of hardware components in an attempt to compensate for said user override command.

11. The method of controlling power management settings as claimed in claim 10, wherein said obtaining includes prompting the user to enter said requested amount of operating time.

12. The method of controlling power management settings as claimed in claim 10, wherein said obtaining includes presenting a range of possible operating times for selecting by said user said requested amount of operating time from said range.

13. The method of controlling power management settings as claimed in claim 12, wherein a minimum of said range is a minimum operating time without adjustment to the power consumption settings, and a maximum of said range is a maximum operating time with adjustment to the power consumption settings.

14. The method of controlling power management settings as claimed in claim 10, wherein said determining includes inventorying a current power charge of said depletable power source and determining said set of power consumption settings that will achieve said requested amount of operating time based upon the current power charge of said depletable power source.

15. The method of controlling power management settings as claimed in claim 10, wherein said depletable power source is selected from a group consisting of a battery, a fuel cell, a capacitor and a super capacitor.

16. The method of controlling power management settings as claimed in claim 10, further comprising the step of:
    monitoring a power charge status of said depletable power source; and
    if said step of monitoring indicates said depletable power source cannot achieve said requested amount of operating time, creating a modified set of power management settings and resetting power management for said set of hardware components to the modified set of power management settings.

17. The method of controlling power management settings as claimed in claim 10, further comprising:
   displaying a warning that said user override command will cause said device to operate for less than the requested amount of operating time.

18. An apparatus adapted to execute code to manage power consumption in a computer system, said computer system having a processor for executing said code, comprising:
   an input module configured to receive from a user a requested amount of operating time for said computer system; and
   a power management module configured to determine power consumption settings for at least one subsystem within said computer system, said power consumption settings being configured to achieve said requested amount of operating time for said computer system until a power source of the apparatus is depleted, wherein the power management module is configured to determine the power consumption settings based on said requested amount of operating time;
   input means configured to accept a user override input overriding the power consumption settings for at least one subsystem, wherein the power management module is configured to adjust a power consumption setting of another subsystem in an attempt to compensate for the user override input.

19. The apparatus adapted to execute code to manage power consumption in a computer system as claimed in claim 18, wherein said input module is adapted to present a prompt requesting user input and said input module is adapted to accept an input of said requested amount of operating time.

20. The apparatus adapted to execute code to manage power consumption in a computer system as claimed in claim 18, wherein said input module is adapted to present a range of time requesting user input and said input module is adapted to accept selection within said range of time for said requested amount of operating time.

21. The apparatus adapted to execute code to manage power consumption in a computer system as claimed in claim 20, wherein a minimum of said range is a minimum operating time without adjustment to the power consumption settings, and a maximum of said range is a maximum operating time with adjustment to the power consumption settings.

22. The apparatus adapted to execute code to manage power consumption in a computer system as claimed in claim 18, wherein said computer system is configured to obtain power from a depletable power source.

23. The apparatus adapted to execute code to manage power consumption in a computer system as claimed in claim 18, further comprising:
   a display device configured to display a warning that said user override input will cause said computer system to operate for less than the requested amount of operating time.

* * * * *